United States Patent Office
2,767,225
Patented Oct. 16, 1956

2,767,225

CHLOROCARBON REDUCTION AND PRODUCTS THEREOF

Charles F. Baranauckas, Niagara Falls, N. Y., and Earl T. McBee, West Lafayette, Ind., assignors to Purdue Research Foundation, Lafayette, Ind., a corporation of Indiana No Drawing. Application August 17, 1951,
Serial No. 242,432

20 Claims. (Cl. 260—648)

The present invention relates to a novel process for the reduction of a ring —CCl₂— group in a chlorocarbon containing a five-carbon-atom ring, at least one carbon atom of which contains two chlorine atoms allylic to at least one double bond. A specific preferred embodiment of the invention relates to the preparation of tetrachlorocyclopentadiene, and is further concerned with the process for the production of tetrachlorocyclopentadiene, a new compound, by the hydrogenation of hexachlorocyclopentadiene.

It is an object of the present invention to provide a process for the reduction of a —CCl₂— group, in the ring of a cyclic chlorocarbon having a five-carbon-atom ring, the chlorine atoms of which —CCl₂— group are allylic to at least one double bond, to a —CH₂— group. Another object of the present invention is to provide the new compound, tetrachlorocyclopentadiene. A further object of the present invention is the provision of a novel process for the preparation of tetrachlorocyclopentadiene from hexachlorocyclopentadiene. A still further object of the present invention is to provide novel compounds which are useful in the preparation of more complex organic molecules having utility in the preparation of resinous polymers. Other objects of the invention will become apparent hereinafter.

The novel compounds of the present invention are valuable intermediates in the preparation of more complex organic compounds, such as the addition products of dienophilic olefins therewith, which are useful constituents in the preparation of resins of the glyceryl phthalate type, as well as in many other ways.

The process of the present invention essentially comprises the reduction, with an inorganic acid and a metal above hydrogen on the electromotive scale, of a —CCl₂— group in a chlorocarbon having a five-carbon-atom ring, said —CCl₂— group being located in the ring and being adjacent to at least one double bond, making the two chlorine atoms of the —CCl₂— group allylic [that is, a

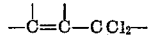

structure]. Stated in another way, the process can be said to comprise or include the reduction to a —CH₂— group, of a —CCl₂— group of a chlorocarbon containing a five-carbon-atom ring, said —CCl₂— group being a portion of said ring and adjacent to at least one carbon atom of said ring attached by a double bond to another carbon of said ring, with a mineral acid and a metal above hydrogen on the electromotive scale. The chlorine atoms of the —CCl₂— group being reduced to a —CH₂— group are preferably allylic to two double bonds, and the method of the present invention as applied to such compounds constitutes a preferred embodiment thereof. This reduction has the unpredictable aspect of replacing, with hydrogen atoms, the two chlorine atoms of a ring —CCl₂— group of the cyclic chlorocarbon structure which are allylic to at least one double bond, and does not involve the replacement of chlorine atoms in positions vinyl to double bonds.

The temperature range for the reduction may be between about 20 degrees centigrade and about 170 degrees centigrade, and is preferably between about 50 degrees and about 110 degrees centigrade to prevent the attainment of color in the product. The metal employed may be any metal above hydrogen on the electromotive scale and is preferably zinc, but may be, for example, magnesium, calcium, iron, or zinc amalgam. The acid employed in the reduction may be any suitable acid of concentration sufficient to react with the zinc, with liberation of hydrogen for the reduction procedure. The metal is preferably in dust form or granulated to ensure more efficient contact of the reactants. Agitation of the reaction mixture is preferably employed, and is considered highly desirable for the attainment of high conversions to the desired product. The reaction is exothermic, and thus little if any heat need be applied externally once the reaction is under way.

A solvent may be used in the process, and such a representative solvent may be petroleum ether, boiling between about 35 and 37 degrees centigrade, although other hydrocarbon and similarly inert reaction solvents may also be employed. The solvent decreases the density of the hexachlorocyclopentadiene or other cyclic chlorocarbons being reduced, and allows better contact of the aqueous acid solution with the metal being reacted upon.

Representative compounds having the requisite characteristics are hexachlorocyclopentadiene, trichlorovinylpentachlorocyclopentadiene, di(trichlorovinyl)tetrachlorocyclopentadiene, tri(trichlorovinyl)trichlorocyclopentadiene, and tetra(trichlorovinyl)dichlorocyclopentadiene. For the preparation of these latter compounds, reference is made to the copending application of McBee and Newcomer, Serial 757,947, filed June 28, 1947, now Patent No. 2,597,016. These compounds may be converted to the corresponding product having, instead of a —CCl₂— group in the ring adjacent to a double bond, a —CH₂— group in the same position. The reactive methylene group in the product produced by the reduction makes the compounds valuable as intermediates in the preparation of more complex organic molecules. Those with a conjugated diene system are especially valuable for reactions with dienophilic olefins, such as maleic anhydride, ethylmaleate, p-benzoquinone, acrylonitrile, and methyl vinyl ketone, usually at a temperature below about 200 degrees centigrade, to produce 1,4 adducts.

The following examples are given to illustrate the practice of the present invention, but are in no way to be construed as limiting.

Example 1.—Reduction of hexachlorocyclopentadiene

Two hundred and seventy-three grams of hexachlorocyclopentadiene (C₅Cl₆) was charged into a one-liter three-neck flask along with 100 milliliters of water, 100 milliliters of petroleum ether (boiling range 35–37 degrees centigrade), and 131 grams of granulated zinc. While the mixture was agitated, six Normal hydrochloric acid was added over a period of four hours until almost all of the metallic zinc had disappeared. The time of addition was four hours. During the reaction, the hydrochloric acid was added at a rate such that the temperature of the reaction mixture did not rise above 65 degrees centigrade. The reaction mixture was stirred for an additional nine hours, whereupon the organic layer was a slurry of crystals. The organic layer was separated from the aqueous layer and the solid removed by filtration. Recrystallization of the solid, 1, 2, 3, 4-tetrachlorocyclopentadiene-1,3, from diethyl ether gave a white product melting at 62–63 degrees centigrade. The chlorine content of the material, by analysis, was 69.9 percent as compared to the theoretical value of 70.3 percent. The molecular weight, determined by the freezing point depression of benzene, was 204, as compared to the theoretical value of 202. The conversion of hexachlorocyclopentadiene to 1,2,3,4-tetrachlorocyclopentadiene-1,3 was 29.7 percent.

The 1,2,3,4-tetrachlorocyclopentadiene-1,3 was further identified by reaction with maleic anhydride in benzene at 80 degrees centigrade for six hours. The hydrolysis of the anhydride addition product produced the dibasic acid, 1,4,5,6-tetrachlorobicyclo(2.2.1)-5-heptene - 2,3 - dicarboxylic acid. The acid has a melting point of 198–200 degrees centigrade and a neutral equivalent of 162, as compared to the theoretical value of 160. The chlorine content of the acid, by analysis, was 44.4 percent, as compared to the theoretical value of 44.37 percent.

1,2,3,4-tetrachlorocyclopentadiene-1,3 reacts with bases, such as sodium carbonate and sodium ethoxide, to yield colored reaction products.

*Example 2.—Reduction of trichlorovinylpentachlorocyclopentadiene*

A solution of 200 grams of trichlorovinylpentachlorocyclopentadiene in 1.5 liters of glacial acetic acid and thirty milliliters of fifty percent sulfuric acid was placed in a three-neck flask equipped with stirrer, thermometer, and condenser. A few grams of zinc were added at room temperature, and, upon heating the stirred mixture to eighty degrees centigrade, an exothermic reaction occurred causing the temperature to rise to 98 degrees centigrade. When the temperature receded to 85 degrees centigrade, a few more grams of zinc were added at room temperature, and, upon heating the stirred mixture to eighty degrees centigrade, an exothermic reaction again occurred causing the temperature to rise to 98 degrees centigrade. When the temperature receded to 85 degrees centigrade, a few more grams of zinc were added, whereupon the temperature rose rapidly to between 95 and 100 degrees centigrade. When the reaction temperature had again receded to 85 degrees centigrade, more zinc was added, and this procedure was repeated until the addition of 165 grams of zinc was complete. Upon the addition of the final quantity of zinc at 85 degrees centigrade, no further exothermic reaction occurred, and no further reaction was noted upon heating to 105 degrees centigrade. The reaction product was diluted with water, filtered, the organic layer separated, washed with water, dried, and then distilled. The product boiled at 130–145 degrees centigrade at 18 millimeters of mercury pressure, and was found to contain 69.6 percent chlorine, corresponding to the theoretical amount, 71.1 percent chlorine, for the compound $C_7Cl_6H_2$, trichlorovinyltrichlorocyclopentadiene.

*Example 3.—Stannous chloride dihydrate treatment of hexachlorocyclopentadiene*

A solution of 816 grams of hexachlorocyclopentadiene and 200 milliliters of acetone were charged into a three-liter three-neck flask equipped with a stirrer, a dropping funnel, and a reflux condenser. A mixture of 600 grams of stannous chloride dihydrate and 1000 milliliters of acetone was added to the stirred solution from the dropping funnel at a rate such that incipient flooding occurred in the reflux condenser during the addition of the stannous chloride-acetone solution. No external heat was applied. The addition required two hours, after which the reaction mixture was stirred overnight. The reaction product was diluted with 3000 milliliters of water, the organic layer separated and washed with water, and dissolved in ether. The mixture was set aside for three weeks, at the end of which time most of the ether had evaporated and a large crop of rectangular crystals were obtained. The crystals weighed 336 grams. Recrystallizations from ether gave an almost colorless solid melting at 215 degrees centigrade. Chlorine content by analysis was 73.6 percent, corresponding approximately to $C_{10}Cl_{10}H_2$.

Various modifications may be made in the method of the present invention without departing from the spirit or scope thereof, and it is to be understood that we limit ourselves only as defined in the appended claims.

We claim:
1. The process which includes: reducing to a —$CH_2$— group, a —$CCl_2$— group of chlorocarbon containing a 5-carbon-atom ring, said —$CCl_2$—group being a portion of said ring and adjacent to at least one carbon atom of said ring attached by a double bond to another carbon of said ring, with a mineral acid and a metal above hydrogen on the electromotive scale.
2. The process of claim 1, wherein the reaction temperature is between about 20 degrees and about 170 degrees centigrade.
3. The process of claim 1, wherein the reaction temperature is between about 50 degrees and about 110 degrees centigrade.
4. The process of claim 1, wherein the metal is zinc.
5. The process of claim 1, wherein the metal is powdered zinc and wherein the acid is hydrochloric acid.
6. The process of claim 1, wherein the —$CCl_2$— group is adjacent to two carbon atoms of the ring which are each attached by a double bond to another carbon of the ring.
7. The process which includes: reducing hexachlorocyclopentadiene with a mineral acid and a metal above hydrogen on the electromotive scale.
8. The process which includes: reducing trichlorovinylpentachlorocyclopentadiene with a mineral acid and a metal above hydrogen on the electromotive scale.
9. The process of claim 7, wherein the reaction temperature is between about 20 degrees and about 170 degrees centigrade.
10. The process of claim 7, wherein the reaction temperature is between about 50 degrees and about 110 degrees centigrade.
11. The process of claim 7, wherein the metal is zinc.
12. The process of claim 7, wherein the metal is powdered zinc and wherein the acid is hydrochloric acid.
13. The process of claim 7, wherein tetrachlorocyclopentadiene is separated from the reaction product.
14. The process of claim 7, wherein the reaction is conducted in the presence of a petroleum hydrocarbon solvent.
15. The process of claim 8, wherein the reaction temperature is between about 20 degrees and about 170 degrees centigrade.
16. The process of claim 8, wherein the reaction temperature is between about 50 degrees and about 110 degrees centigrade.
17. The process of claim 8, wherein the metal is zinc.
18. The process of claim 8, wherein the metal is powdered zinc and wherein the acid is hydrochloric acid.
19. The process of claim 8, wherein trichlorovinyltrichlorocyclopentadiene is separated from the reaction product.
20. The process of claim 8, wherein the reaction is conducted in the presence of a petroleum hydrocarbon solvent.

References Cited in the file of this patent

UNITED STATES PATENTS

| | | |
|---|---|---|
| 2,121,183 | Binapfl | June 21, 1938 |
| 2,146,720 | Christiansen | Feb. 14, 1939 |
| 2,179,809 | Bockemuller | Nov. 14, 1939 |
| 2,424,948 | Wells et al. | July 29, 1947 |
| 2,436,491 | Schmerling | Feb. 24, 1948 |

OTHER REFERENCES

Straus et al.: "Ber. der deut. Chem. Ges.," vol. 63, page 1870 (1930).

Brown et al.: "Chemical Society Journal" (1944), pages 101–3.